(12) United States Patent  (10) Patent No.: US 8,778,526 B2
Guen  (45) Date of Patent: Jul. 15, 2014

(54) SECONDARY BATTERY

(75) Inventor: Minhyung Guen, Yongin-si (KR)

(73) Assignees: Samsung SDI Co., Ltd., Yongin-Si, Gyeonggi-Do (KR); Robert Bosch GmbH, Stuttgart (DE)

( * ) Notice: Subject to any disclaimer, the term of this patent is extended or adjusted under 35 U.S.C. 154(b) by 225 days.

(21) Appl. No.: 13/067,026

(22) Filed: May 3, 2011

(65) Prior Publication Data

US 2012/0156550 A1  Jun. 21, 2012

(30) Foreign Application Priority Data

Dec. 15, 2010  (KR) .................. 10-2010-0128210

(51) Int. Cl.
*H01M 2/00* (2006.01)
(52) U.S. Cl.
USPC .......................................... 429/163; 429/176
(58) Field of Classification Search
None
See application file for complete search history.

(56) References Cited

U.S. PATENT DOCUMENTS

| 2006/0093910 A1 | 5/2006 | Yoon et al. |
| 2008/0107961 A1 | 5/2008 | Jeong et al. |
| 2010/0047685 A1 | 2/2010 | Lee et al. |
| 2013/0130098 A1 | 5/2013 | Lee et al. |

FOREIGN PATENT DOCUMENTS

| KR | 10-2006-0037594 A | 3/2006 |
| KR | 10-2007-0025687 A | 3/2007 |
| KR | 2007-0075941 A | 7/2007 |
| KR | 2008-0017264 A | 2/2008 |
| KR | 10-0823193 B1 | 4/2008 |

*Primary Examiner* — Milton I Cano
*Assistant Examiner* — Carmen Lyles-Irving
(74) *Attorney, Agent, or Firm* — Lee & Morse, P.C.

(57) ABSTRACT

A secondary battery includes an electrode assembly having a first electrode plate with a first electrode non-coated portion, the first electrode non-coated portion including a first protrusion part at an upper part of the electrode assembly, a second electrode plate with a second electrode non-coated portion, the second electrode non-coated portion including a second protrusion part at an upper part of the electrode assembly, and a separator disposed between the first and second electrode plates, first and second current collecting plates electrically connected to respective first and second electrode plates, and a case accommodating the electrode assembly and the first and second current collecting plates, the case having a shape corresponding to the first and second protrusion parts of the electrode assembly.

20 Claims, 5 Drawing Sheets

SECONDARY BATTERY

BACKGROUND

1. Field

Embodiments relate to a secondary battery.

2. Description of the Related Art

Secondary batteries are rechargeable, unlike primary batteries. Among such secondary batteries, a low capacity battery including a battery cell in the form of a pack may be used for small portable electronic devices, e.g., cellular phones and camcorders, and a high capacity battery including dozens of battery cells connected to one another may be used as a motor-driving power source, e.g., for electric scooters, hybrid vehicles, or electric vehicles.

Secondary batteries are manufactured in various shapes, e.g., a cylindrical shape and a prismatic shape. A secondary battery is constructed as follows: an electrode assembly formed by disposing an insulating separator between a positive electrode plate and a negative electrode plate is placed in a case together with an electrolyte, and a cap plate is disposed on the case. The electrode assembly is connected to positive and negative terminals, which protrude from the cap plate and are exposed to the exterior of the electrode assembly.

SUMMARY

Example embodiments provide a secondary battery in which an electrode non-coated portion is reduced to minimize the size and weight of a cell. As such, production yield may be improved.

According to at least one of embodiments, a secondary battery may include an electrode assembly having a first electrode plate with a first electrode non-coated portion, the first electrode non-coated portion including a first protrusion part at an upper part of the electrode assembly, a second electrode plate with a second electrode non-coated portion, the second electrode non-coated portion including a second protrusion part at an upper part of the electrode assembly, and a separator disposed between the first and second electrode plates, first and second current collecting plates electrically connected to respective first and second electrode plates, and a case accommodating the electrode assembly and the first and second current collecting plates, the case having a shape corresponding to the first and second protrusion parts of the electrode assembly.

The first and second protrusion parts may contact the first and second current collecting plates, respectively.

The case may include first and second vertical regions overlapping the respective first and second protrusion parts, and first and second recess regions disposed under the first and second vertical regions and recessed toward the electrode assembly.

A distance between the first and second vertical regions may be larger than a distance between the first and second recess regions.

The case may further include first and second support regions coupling the first and second vertical regions to respective first and second recess regions.

The first and second support regions may contact the first and second protrusion parts.

The first and second support regions may be sloped toward the electrode assembly.

The first and second support regions may include insulating members, the first and second support regions being insulated from the first and second protrusion parts.

The secondary battery may further include third and fourth electrode non-coated portions under the first and second electrode non-coated portions, respectively.

The third and fourth electrode non-coated portions may include third and fourth protrusion parts extending from both end parts of a lower part of the electrode assembly, respectively.

The third and fourth protrusion parts may have protruded lengths smaller than protruded lengths of the first and second protrusion parts.

A width of a top of the case may be larger than a width of a bottom of the case.

A width of a top of the electrode assembly may be larger than a width of a bottom of the electrode assembly.

The width of the top of the electrode assembly may be larger than the width of the bottom of the electrode assembly by at least two widths of the first protrusion part.

The first and second electrode non-coated portions may be only at the upper part of the electrode assembly.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
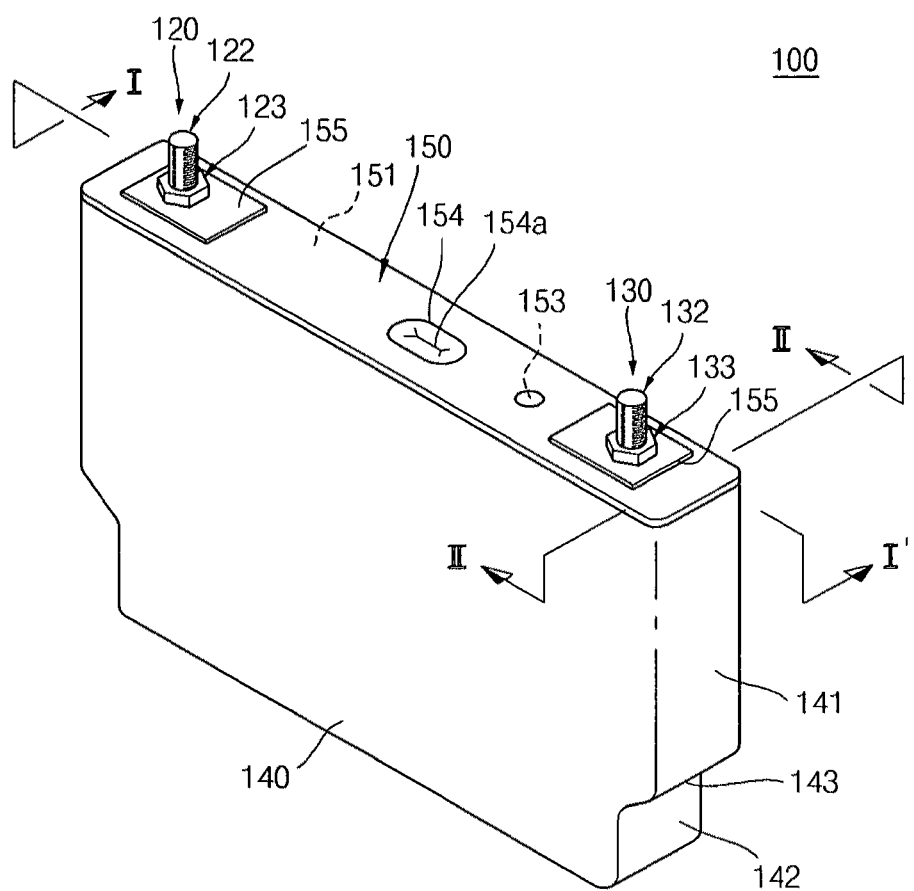
FIG. 1 illustrates a perspective view of a secondary battery according to an embodiment.

Korean Patent Application No. 10-2010-0128210 filed on Dec. 15, 2010, in the Korean Intellectual Property Office, and entitled: "secondary battery" is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the disclosure to those skilled in the art.

In the drawing figures, the dimensions of layers and regions may be exaggerated for clarity of illustration. It will also be understood that when a layer (or element) is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

Figure 2:
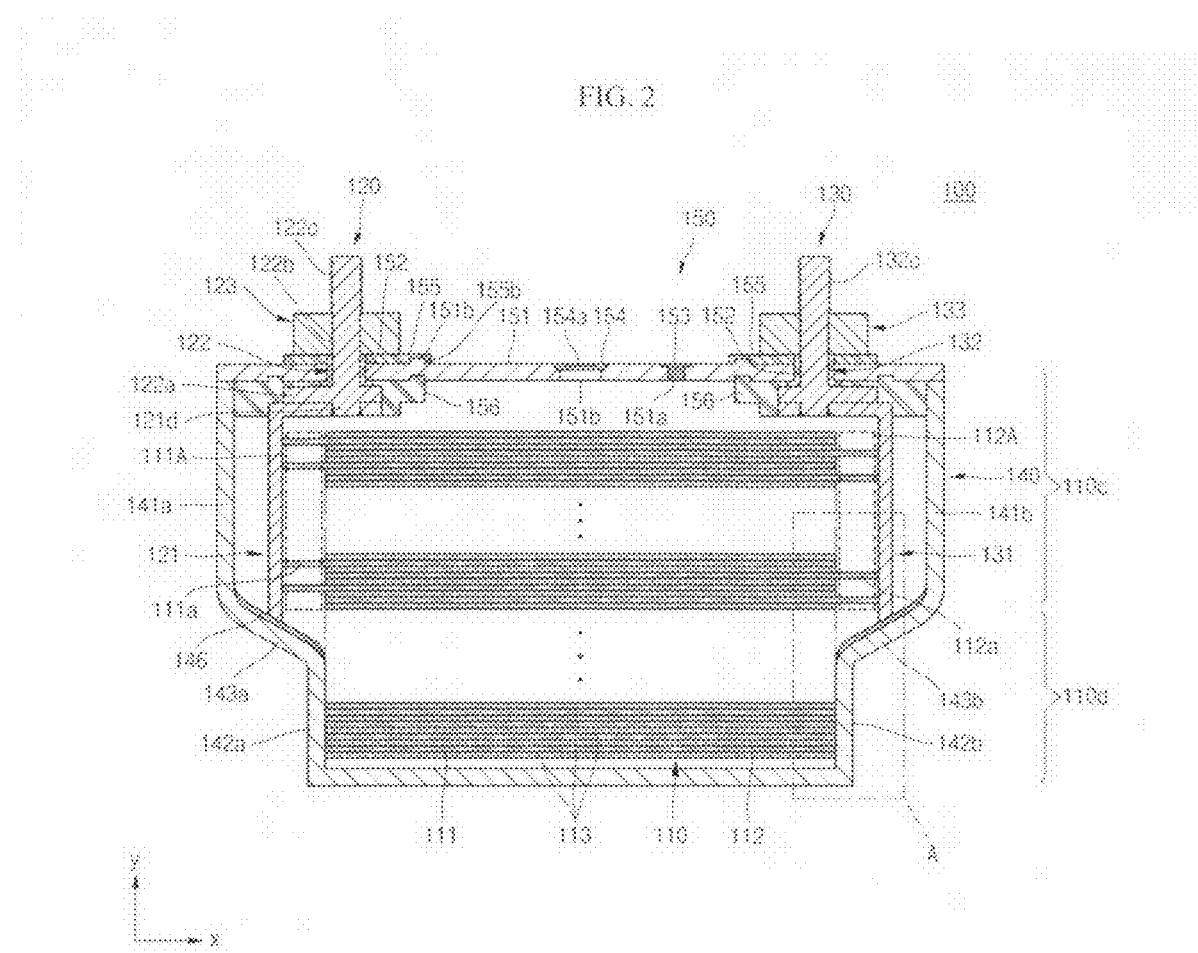
FIG. 2 illustrates a cross-sectional view taken along line I-I' of FIG. 1.
Figure 3:
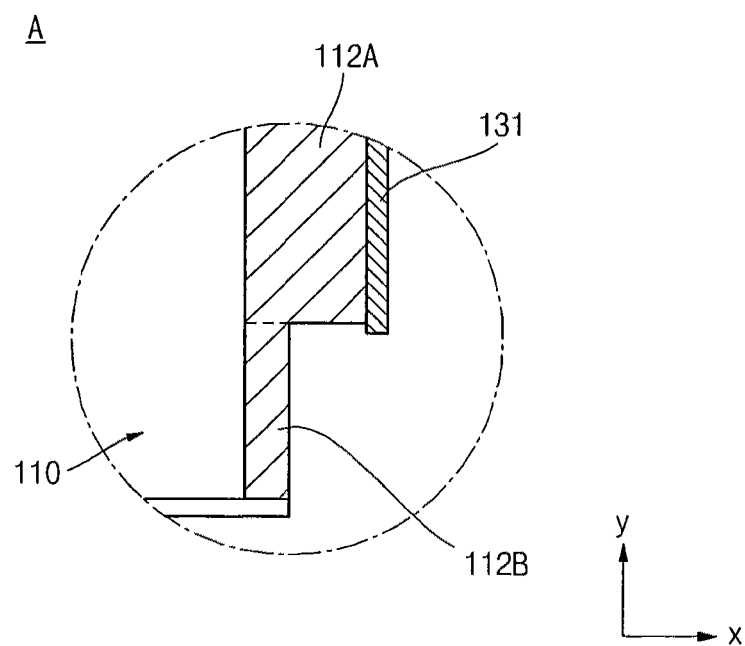
FIG. 3 illustrates an enlarged view of portion A of FIG. 2.
Figure 4:
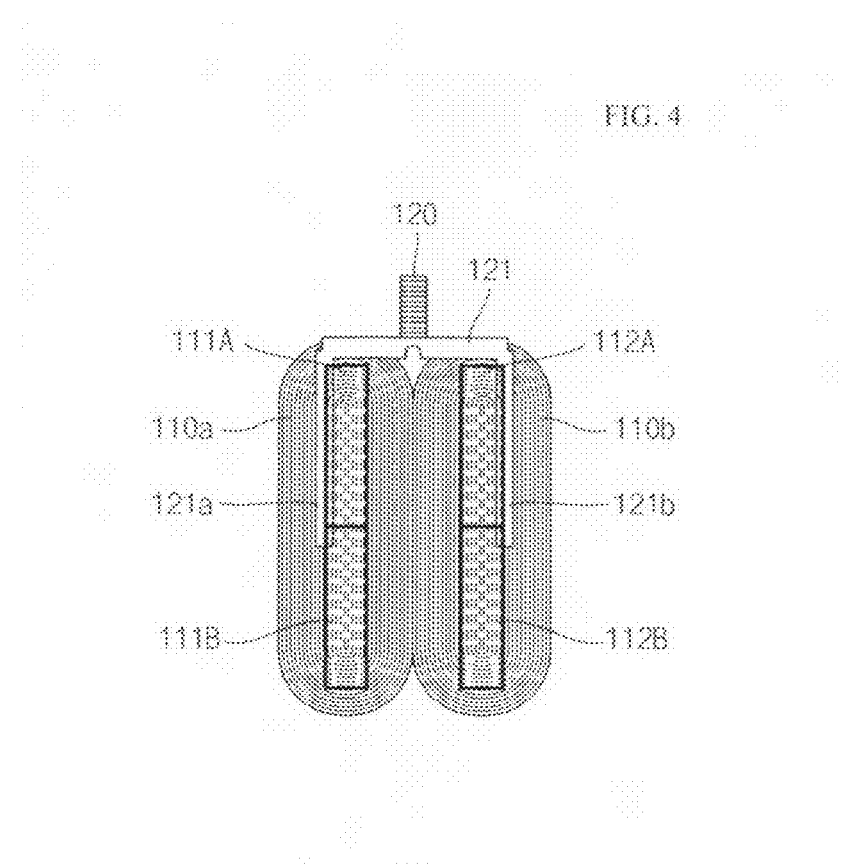
FIG. 4 illustrates a cross-sectional view taken along line II-II' of FIG. 1.

Hereinafter, embodiments will be described in detail with reference to FIGS. 1-4. FIG. 1 is a perspective view illustrating a secondary battery according to an embodiment, FIG. 2 is a cross-sectional view along line I-I' of FIG. 1, FIG. 3 is an enlarged view of portion A of FIG. 2, and FIG. 4 is a cross-sectional view along line II-IF of FIG. 1. It is noted that FIG. 3 illustrates a schematic representation of relative structures in portion A.

Referring to FIGS. 1 through 4, a secondary battery 100 may include an electrode assembly 110, a first terminal 120, a second terminal 130, a case 140, and a cap assembly 150.

The electrode assembly 110 may be formed by winding or stacking a first electrode plate 111, a separator 113, and a second electrode plate 112, which have a thin plate or film shape. The first electrode plate 111 may function as a negative electrode, and the second electrode plate 112 may function as a positive electrode. Alternatively, the first electrode plate 111 and the second electrode plate 112 may function oppositely, i.e., the polarities of the first electrode plate 111 and the second 112 may be changed with each other.

The first electrode plate 111 may be formed by applying a first electrode active material, e.g., graphite or carbon, to a first electrode collector formed of metal foil, e.g., copper or nickel foil. The first electrode plate 111 may include a first electrode non-coated portion 111a to which the first electrode active metal is not applied. In the current embodiment, materials that may be used to form the first electrode plate 111 are not limited to the above-mentioned materials. When a first current collecting plate 121 (described later) is welded to the first electrode non-coated portion 111a, e.g., by using ultrasonic waves, a part of the first electrode non-coated portion 111a located in a lower region of the electrode assembly 110 is unnecessary. Therefore, in the current embodiment, the first electrode non-coated portion 111a may include a first protrusion part 111A extending from an upper end part of a side of the electrode assembly 110, and the unnecessary part of the electrode non-coated portion 111a is removed. The first electrode non-coated portion 111a functions as a current flow passage between the first electrode plate 111 and the outside of the first electrode plate 111.

In detail, as illustrated in FIG. 2, the first electrode non-coated portion 111a may be formed at an upper part 110c of the electrode assembly 110. That is, while the first electrode plate 111 is stacked from a bottom of the electrode assembly 110 toward a top of the electrode assembly 110, the first electrode non-coated portion 111a may be only at the upper part 110c of the electrode assembly 110, i.e., a part adjacent to the cap assembly 150. For example, the first electrode non-coated portion 111a may be formed only in a region overlapping the first current collecting plate 121, so a portion of the electrode assembly 110 below the first current collecting plate 121 may not include the first electrode non-coated portion 111a. The first electrode non-coated portion 111a may extend along a first direction, e.g., along the x-axis, toward a first vertical region 141a of a sidewall of the case 140, and may include the first protrusion part 111A. Therefore, the first protrusion part 111A may increase a width of the upper part 110c of the electrode assembly 110 relative to a bottom part 110d of the electrode assembly 110. In other words, the upper part 110c of the electrode assembly 110 may be wider than the bottom part 110d of the electrode assembly 110 along the first direction.

It is noted, however, that example embodiments are not limited to the above. For example, an electrode non-coated portion may also be formed at the bottom part 110d of the electrode assembly 110. In this case, a third protrusion part (not shown) may extend from the bottom part 110d of the electrode assembly 110. The protruded length of the third protrusion part, however, may be smaller than the protruded length of the first protrusion part 111A along the first direction. Therefore, even if the electrode assembly 110 includes the third protrusion, the upper part 110a of the electrode assembly 110 may be wider than the bottom part 110d.

The second electrode plate 112 is formed by applying a second electrode active material, e.g., a transition metal oxide, to a second electrode collector formed of metal foil, e.g., aluminum foil. The second electrode plate 112 may include a second electrode non-coated portion 112a to which the second electrode active metal is not applied. In the current embodiment, materials that may be used to form the second electrode plate 112 are not limited to the above-mentioned materials. When a second current collecting plate 131 (described later) is welded to the second electrode non-coated portion 112a, e.g., by using ultrasonic waves, a part of the second electrode non-coated portion 112a located in a lower region of the electrode assembly 110 is unnecessary. Therefore, in the current embodiment, the second electrode non-coated portion 112a may include a second protrusion part 112A extending from an upper end part of a side of the electrode assembly 110, and the unnecessary part of the second electrode non-coated portion 112a is removed. The second protrusion part 112A may have a substantially same structure as the first protrusion part 111A described previously, so the electrode assembly 110 is symmetrical with respect to the y-axis. The second electrode non-coated portion 112a functions as a current flow passage between the second electrode plate 112 and the outside of the second electrode plate 112.

In the current embodiment, the second electrode non-coated portion 112a is formed at the upper part 110c of the electrode assembly 110. However, an electrode non-coated portion may also be formed at the bottom part 110d of the electrode assembly 110. In this case, a fourth protrusion part 112B (FIG. 3) may extend at the bottom part 110d of the electrode assembly 110. The protruded length of the fourth protrusion part 112B may be smaller than the protruded length of the second protrusion part 112A along the first direction.

The first and second protrusion parts 111A and 112A function as current flow passages from the first and second electrode plates 111 and 112 to the first and second current collecting plates 121 and 131, respectively.

In addition, as shown in FIG. 4, the electrode assembly 110 may include at least two electrode assemblies 110a and 110b. The first terminal 120 and the second terminal 130 may be electrically connected to the two electrode assemblies 110a and 110b. In this case, first and second protrusion parts 111A and 112A may protrude from upper parts of both sides of the electrode assemblies 110a and 110b. That is, the first and second protrusion parts 111A and 112A may be formed at both sides of the electrode assemblies 110a and 110b. The first protrusion part 111A formed at the upper parts of one sides of the electrode assemblies 110a and 110b are electrically connected to the first terminal 120 through the first current collecting plate 121. The second terminal 130 may have a same structure as that of the first terminal 120, and may be electrically connected through the second current collecting plate 131 to the second protrusion part 112A formed at the upper parts of the other sides of the electrode assemblies 110a and 110b.

According to the electrode assembly 110 having the first protrusion part 111A and the second protrusion part 112A, when the first electrode non-coated portion 111a and the second electrode non-coated portion 112a are welded to the respective first current collecting plate 121 and the second current collecting plate 131, e.g., by using ultrasonic waves, there may be no dead space at the lower part 110d of the electrode assembly 110. That is, sidewalls of the case 140 may be adjusted (as will be discussed in detail below), so bottom edges of the first and second current collecting plates 121 and 131 may be positioned closely to the sidewalls of the case 140 in order to eliminate or substantially minimize dead space in the case 140. Thus, since a dead space is not formed at the bottom part 110d of the electrode assembly 110, e.g., as compared to a conventional battery case, the size and weight of a battery cell of the secondary battery 100 may be reduced, and production yield may be improved.

The height, e.g., along the y-axis, from the bottom side of the electrode assembly 110 to the first protrusion part 111A may be equal to the height from the bottom side of the electrode assembly 110 to the second protrusion part 112A.

The separator 113 may be disposed between the first electrode plate 111 and the second electrode plate 112 to prevent a short circuit and allow movement of lithium ions. The separator 113 may be formed, e.g., of a poly ethylene film, a poly propylene film, or a film including poly ethylene and poly propylene. In the current embodiment, materials that may be used to form the separator 113 are not limited to the above-mentioned materials.

The electrode assembly 110 may be accommodated in the case 140 together with an electrolyte. The electrolyte may include an organic solvent, e.g., ethylene carbonate (EC), propylene carbonate (PC), diethyl carbonate (DEC), ethyl methyl carbonate (EMC), and/or dimethyl carbonate (DMC), and a lithium salt, e.g., $LiPF_6$ or $LiBF_4$. The electrolyte may be liquid, solid, or gel.

The first and second terminals 120 and 130 may be coupled to both end parts of the electrode assembly 110 in a manner such that the first and second terminals 120 and 130 are electrically connected to the first and second electrode plates 111 and 112, respectively. The first terminal 120 may be formed of a metal or an equivalent thereof, and may be electrically connected to the first electrode plate 111. The first terminal 120 may include the first current collecting plate 121, a first current collecting terminal 122, and a first terminal plate 123.

The first current collecting plate 121 may contact the first electrode non-coated portion 111a protruding from the upper part 110c of the electrode assembly 110. The first current collecting plate 121 may be welded to the first electrode non-coated portion 111a. The first current collecting plate 121 may have an approximately reverse L-shape, and a terminal hole 121d may be formed in the upper portion of the first current collecting plate 121. The first current collecting terminal 122 may be fitted and coupled to the first terminal hole 121d. For example, the first current collecting plate 121 may be formed of e.g., copper or a copper alloy. However, the material of the first current collecting plate 121 is not limited thereto.

The first current collecting terminal 122 may penetrate a cap plate 151 (described later) and protrude upwardly by a predetermined length. The first current collecting terminal 122 may be electrically connected to the first current collecting plate 121 at the lower side of the cap plate 151. The first current collecting terminal 122 may extend and protrude upward from the cap plate 151 by a predetermined length, and along with this, the first current collecting terminal 122 may include a flange 122a at a position under the cap plate 151 so that the first current collecting terminal 122 cannot be separated from the cap plate 151.

A part of the first current collecting terminal 122 located at the lower side of the flange 122a may be inserted and welded in the first terminal hole 121d of the first current collecting plate 121. A part of the first current collecting terminal 122 located at the higher side of the flange 122a may be inserted in the first terminal plate 123. That is, the part of the first current collecting terminal 122 located at the higher side of the flange 122a may include a first body part 122b penetrating the cap plate 151, and a first coupling part 122c extending from the top side of the first body part 122b and screw-coupled to the first terminal plate 123. A thread may be formed on the outer surface of the first coupling part 122c. Alternatively, the first coupling part 122c may be coupled to the first terminal plate 123 by riveting. The first current collecting terminal 122 may be electrically insulated from the cap plate 151. For example, the first current collecting terminal 122 may be formed of, e.g., at least one of copper, copper alloy, and an equivalent thereof. However, the material of the first current collecting terminal 122 is not limited thereto.

The first terminal plate 123 may be a nut having an approximately hexagonal pillar shape and configured to be coupled with the first coupling part 122c. Alternatively, the first terminal plate 123 may have another shape. For example, a penetration hole (not shown) may be formed through a center part of the first terminal plate 123 in an approximately vertical direction so that the first current collecting terminal 122 may be inserted through the first terminal plate 123, and a receiving groove (not shown) having a predetermined depth may be formed in an upper part of the first terminal plate 123 so that the first coupling part 122c may be accommodated. The first terminal plate 123 may be formed of, e.g., at least one of stainless steel, copper, copper alloy, aluminum, aluminum alloy, and an equivalent thereof. However, the current embodiment is not limited to such materials. The first terminal plate 123 and the cap plate 151 may be insulated from each other.

The second terminal 130 may be formed of a metal or an equivalent thereof, and may be electrically connected to the second electrode plate 112. The second terminal 130 may include the second current collecting plate 131, a second current collecting terminal 132, and a second terminal plate 133. The second terminal 130 may have the same shape as that of the first terminal 120. Thus, the shape of the second terminal 130 will not be described again. The second current collecting plate 131 and the second current collecting terminal 132 may be formed of, e.g., at least one of aluminum, an aluminum alloy, and an equivalent thereof. However, the current embodiment is not limited to such materials. The second terminal plate 133 may be formed of, e.g., at least one of stainless steel, aluminum, aluminum alloy, copper, copper alloy, and an equivalent thereof. However, the current embodiment is not limited thereto.

In addition, the second terminal plate 133 may be electrically connected to the cap plate 151. In this case, the case 140 and the cap plate 151 (that will be described below in detail) may have the same polarity (for example, positive polarity) as that of the second terminal 130.

The case 140 may be formed of a conductive metal, e.g., aluminum, aluminum alloy, or steel plated with nickel. The case 140 may accommodate the electrode assembly 110, the first current collecting terminal 122, and the second current collecting terminal 132. The case 140 may include an opening, so that the electrode assembly 110, the first terminal 120, and the second terminal 130 may be inserted and placed in the case 140. In FIG. 2, the case 140 and the cap assembly 150 are coupled to each other, so the opening of the case 140 is not shown. However, the peripheral part of the cap assembly 150 substantially corresponds to the opening of the case 140. An inner surface of the case 140 may be treated to be electrically insulated from the electrode assembly 110, the first and second terminals 120 and 130, and the cap assembly 150.

Both sides of the case 140 may have a shape corresponding to, e.g., tracing an outline of, the first and second protrusion parts 111A and 112A extending from both ends of the upper part of the electrode assembly 110. For example, the shape of the case 140 may be adjusted to closely surround, e.g., conform to, the shape of the electrode assembly 110, so relative protruding parts in the electrode assembly 110 may be reflected in relative protruding, e.g., wider, parts in the case 140. Therefore, a top of the case 140 may be wider along the first direction than a bottom of the case 140. Referring to FIG. 2, the case 140 may include first and second vertical regions 141a and 141b that cover, e.g., overlap, the first and second protrusion parts 111A and 112A, first and second recess regions 142a and 142b that are located under the first and second vertical regions 141a and 141b and are recessed toward the electrode assembly 110, and first and second support regions 143a and 143b that connect the first and second vertical regions 141a and 141b to the respective first and second recess regions 142a and 142b.

For example, the first and second recess regions 142a and 142b may extend along the y-axis in parallel to the first and second vertical regions 141a and 141b, and may be spaced apart from the first and second vertical regions 141a and 141b along the x-axis. The first and second recess regions 142a and 142b may extend to a predetermined height along the bottom part 110d of the electrode assembly 110, so upper ends of the first and second recess regions 142a and 142b may be in close proximity to bottom ends of the first and second protrusion parts 111A and 112A. As a distance between the first and second recess regions 142a and 142b along the x-axis is smaller than a distance between the first and second vertical regions 141a and 141b, dead space under the first and second current collecting palates 121 and 131 may be eliminated, e.g., as compared to conventional battery cases.

For example, the first and second support regions 143a and 143b may be in contact with the first and second protrusion parts 111A and 112A and support the first and second protrusion parts 111A and 112A. The first and second support regions 143a and 143b may be sloped toward the electrode assembly 110, e.g., the first and second support regions 143a and 143b may extend at an oblique angle with respect to the y-axis in order to connect the first and second vertical regions 141a and 141b to the respective first and second recess regions 142a and 142b.

Therefore, since both sides of the case 140 have a shape corresponding to the first and second protrusion parts 111A and 112A formed at both ends of the upper part of the electrode assembly 110, the size of the battery cell may be reduced, and the process yield of the case 140 may be improved.

The first and second support regions 143a and 143b may include insulation members 146 for insulation from the first and second protrusion parts 111A and 112A.

The cap assembly 150 may be coupled to the case 140. In detail, the cap assembly 150 may include the cap plate 151, sealing gaskets 152, a plug 153, a safety vent 154, upper insulation members 155, and lower insulation members 156. The sealing gaskets 152, the upper insulation members 155, and the lower insulation members 156 may be considered as elements of the first and second terminals 120 and 130.

The cap plate 151 closes the opening of the case 140. The cap plate 151 may be formed of the same material as that used to form the case 140. For example, the cap plate 151 may be coupled to the case 140 by laser welding. As described above, the cap plate 151 may have the same polarity as that of the second terminal 130. In this case, the cap plate 151 and the case 140 may have the same polarity.

The sealing gaskets 152 may be formed of an insulating material and may be disposed between the cap plate 151 and the first and second current collecting terminals 122 and 132 to seal the gaps between the cap plate 151 and the first and second current collecting terminals 122 and 132. The sealing gaskets 152 prevent permeation of moisture into the secondary battery 100 or leakage of the electrolyte from the secondary battery 100.

The plug 153 closes an electrolyte injection hole 151a of the cap plate 151. The safety vent 154 is disposed on a vent hole 151b of the cap plate 151, and a notch 154a is formed in the safety vent 154 so that the safety vent 154 may be opened at a preset pressure.

The upper insulation members 155 may be disposed between the cap plate 151 and the first and second terminal plates 123 and 133. In addition, the upper insulation members 155 make tight contact with the cap plate 151. Furthermore, the upper insulation members 155 may make tight contact with the sealing gaskets 152. The upper insulation members 155 insulate the cap plate 151 from the first and second terminal plates 123 and 133.

The lower insulation members 156 may be disposed between the cap plate 151 and the first and second current collecting plates 121 and 131 to prevent a short circuit. That is, the lower insulation members 156 prevent a short circuit between the first current collecting plate 121 and the cap plate 151 and a short circuit between the second current collecting plate 131 and the cap plate 151. The lower insulation members 156 may be disposed between the cap plate 151 and the first and second current collecting terminals 122 and 132 so that a short circuit may be prevented between the cap plate 151 and the first and second current collecting terminals 122 and 132.

Figure 5:
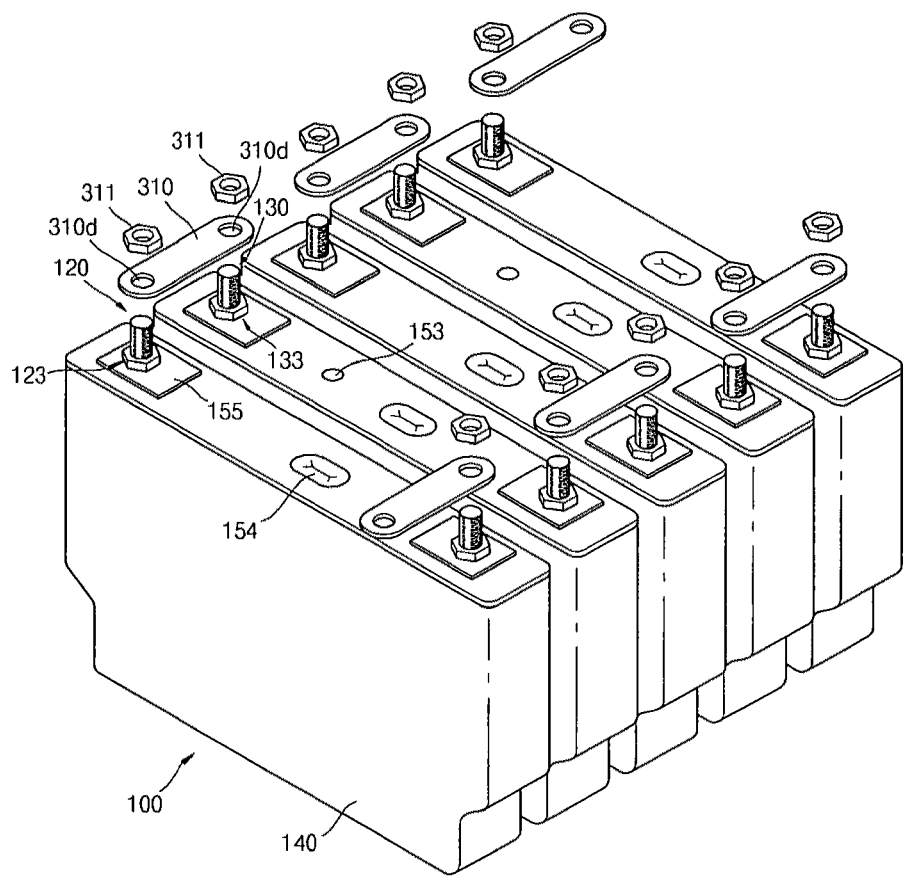
FIG. 5 illustrates a schematic view of a method of coupling secondary batteries with bus bars according to an embodiment.

FIG. 5 illustrates a schematic view of a method of coupling secondary batteries with bus bars according to an embodiment. As illustrated in FIG. 5, a plurality of secondary batteries 100 may be connected in series and/or in parallel with each other by using conductive bus bars 310. Penetration holes 310d may be formed through each of the bus bars 310, and the first and second current collecting terminals 122 and 132 of the secondary batteries 100 may be inserted through the penetration holes 310d. Nuts 311 may be coupled to the first and second current collecting terminals 122 and 132 inserted through the bus bars 310. Therefore, the bus bars 310 may be coupled to the first and second current collecting terminals 122 and 132 by using the nuts 311, so the bus bars 310 may be in tight contact with the first and second terminal plates 123 and 133.

Since relatively large current passages are formed by the first and second current collecting terminals 122 and 132, the terminal plates 123 and 133, and the bus bars 310, terminal resistance may be reduced. Therefore, according to the embodiments, since the electrode non-coated portions 111a and 112a of the secondary battery 100 may be reduced, and the case 140 may have a shape corresponding to the electrode non-coated portions 111a and 112a, the size and weight of the battery cell may be reduced. Therefore, production yield may be improved, and manufacturing costs may be reduced.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present disclosure as set forth in the following claims.

What is claimed is:

1. A secondary battery, comprising:
an electrode assembly including:
a first electrode plate with a first electrode non-coated portion, the first electrode non-coated portion including a first protrusion part at an upper part of the electrode assembly,
a second electrode plate with a second electrode non-coated portion, the second electrode non-coated portion including a second protrusion part at an upper part of the electrode assembly, the first and second protrusion parts extending a width of the upper part of the electrode assembly to be larger than an entire width of a lower part of the electrode assembly, the lower part of the electrode assembly including a bottom of the electrode assembly, and
a separator disposed between the first and second electrode plates;
first and second current collecting plates electrically connected to respective first and second electrode plates; and
a case accommodating the electrode assembly and the first and second current collecting plates, the case having a shape corresponding to the first and second protrusion parts of the electrode assembly, the case having an upper width corresponding to the upper width of the electrode assembly and to the first and second current collecting plates, and a lower width corresponding to the lower width of the electrode assembly and to the bottom of the electrode assembly, the entire lower width of the case being equal to or larger than the lower width of the electrode assembly and smaller than the upper width of the electrode assembly.

2. The secondary battery as claimed in claim 1, wherein the first and second protrusion parts contact the first and second current collecting plates, respectively.

3. The secondary battery as claimed in claim 1, wherein the case includes:
first and second vertical regions overlapping the respective first and second protrusion parts, and the respective first and second current collecting plates; and
first and second recess regions disposed under the first and second vertical regions and recessed toward the electrode assembly, the first and second recess regions extending along entire widths of respective narrow lateral sides of the case, and extending vertically from the first and second vertical regions, respectively, to contact a bottom of the case.

4. The secondary battery as claimed in claim 3, wherein a distance between the first and second vertical regions is larger than a distance between the first and second recess regions.

5. The secondary battery as claimed in claim 3, wherein the case further comprises first and second support regions coupling the first and second vertical regions to respective first and second recess regions.

6. The secondary battery as claimed in claim 5, wherein the first and second support regions contact the first and second protrusion parts.

7. The secondary battery as claimed in claim 5, wherein the first and second support regions are sloped toward the electrode assembly.

8. The secondary battery as claimed in claim 7, wherein the first and second support regions include insulating members, the first and second support regions being insulated from the first and second protrusion parts.

9. The secondary battery as claimed in claim 1, further comprising third and fourth electrode non-coated portions under the first and second electrode non-coated portions, respectively.

10. The secondary battery as claimed in claim 9, wherein the third and fourth electrode non-coated portions include third and fourth protrusion parts extending from both end parts of a lower part of the electrode assembly, respectively.

11. The secondary battery as claimed in claim 10, wherein the third and fourth protrusion parts have protruded lengths smaller than protruded lengths of the first and second protrusion parts.

12. The secondary battery as claimed in claim 1, wherein a width of a top of the electrode assembly is larger than a width of a bottom of the electrode assembly by at least two widths of the first protrusion part.

13. The secondary battery as claimed in claim 1, wherein the first and second electrode non-coated portions are only at the upper part of the electrode assembly, the lower part of the electrode assembly having no electrode non-coated portions.

14. The secondary battery as claimed in claim 1, wherein the first and second electrode plates extend beyond the separator along the width of the electrode assembly only at the upper part of the electrode assembly.

15. The secondary battery as claimed in claim 14, wherein the first and second protrusion parts of respective first and second electrode non-coated portions extend beyond the separator along the width of the electrode assembly only at the upper part of the electrode assembly.

16. The secondary battery as claimed in claim 1, wherein the first and second electrode non-coated portions are positioned only at regions adjacent to the first and second current collecting plates, respectively, the first and second electrode plates having no non-coated portions under the first and second current collecting plates, respectively.

17. The secondary battery as claimed in claim 1, wherein the case includes wide lateral sidewalls and narrow lateral sidewalls, the narrow lateral sidewalls having a uniform width and being continuous along an entire height of the case, the narrow lateral sidewalls including recess regions extending along entire widths of respective narrow lateral sides of the case, the width of the narrow lateral sidewalls being measured along a direction perpendicular to a width of the wide lateral sidewalls and to the width of the case.

18. The secondary battery as claimed in claim 17, wherein an entire outer surface of each of the narrow lateral sidewalls of the case is continuous and is facing away from the electrode assembly.

19. The secondary battery as claimed in claim 17, wherein sidewalls of the recess regions extend along and directly contact the entire lower width of the electrode assembly, the recess regions contacting only an outermost edge of the electrode assembly.

20. The secondary battery as claimed in claim 1, wherein the lower width of the case is defined by recess regions indented toward the electrode assembly, the recess regions being completely external with respect to the electrode assembly.

* * * * *